(12) United States Patent
Stegmaier et al.

(10) Patent No.: US 12,207,115 B2
(45) Date of Patent: Jan. 21, 2025

(54) RADIO FREQUENCY MEASUREMENT SYSTEM AND A METHOD FOR RECORDING BASEBAND AND POSITIONING DATA

(71) Applicant: Rohde & Schwarz GmbH & Co. KG, Munich (DE)

(72) Inventors: Joachim Stegmaier, Munich (DE); Christoph Hausl, Munich (DE); Corbett Rowell, Munich (DE); Frédéric Pierre Denis Boulay, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 355 days.

(21) Appl. No.: 17/817,469

(22) Filed: Aug. 4, 2022

(65) Prior Publication Data

US 2023/0076938 A1    Mar. 9, 2023

(30) Foreign Application Priority Data

Sep. 3, 2021 (EP) .................................... 21194797

(51) Int. Cl.
*H04W 24/00* (2009.01)
*G01S 19/01* (2010.01)
(Continued)

(52) U.S. Cl.
CPC ............. *H04W 24/08* (2013.01); *G01S 19/01* (2013.01); *G01S 19/42* (2013.01); *H04W 56/001* (2013.01); *H04W 72/046* (2013.01)

(58) Field of Classification Search
CPC . H04W 24/08; H04W 56/001; H04W 72/046; G01S 19/01; G01S 19/42; H04B 1/3805
See application file for complete search history.

(56) References Cited

U.S. PATENT DOCUMENTS 8,565,689 B1    10/2013 Rubin et al.
11,082,871 B1 *  8/2021 Chan .................... H04B 17/318
(Continued)

FOREIGN PATENT DOCUMENTS

EP    2589983 A1    5/2013
WO    01/13548 A1   2/2001
WO    01/58195 A1   8/2001

OTHER PUBLICATIONS

Cidronali, A. et al., "Analysis and Performance of a Smart Antenna for 2.45-GHz Single-Anchor Indoor Positioning," IEEE Transactions on Microwave Theory and Techniques, vol. 58, No. 1, Jan. 2010, pp. 21-31.

*Primary Examiner* — Ping Y Hsieh
(74) *Attorney, Agent, or Firm* — CHRISTENSEN O'CONNOR JOHNSON KINDNESS PLLC (57) ABSTRACT

The present disclosure relates to a radio frequency (RF) measurement system and a method for recording baseband and positioning data. The RF measurement system includes at least one RF measurement device. The RF measurement device includes at least one RF chain and at least one data processing circuit connected to a memory device. The RF measurement device is configured to receive a global navigation satellite system (GNSS) signal. The GNSS signal is indicative of a position and/or a bearing. The RF measurement device is configured to receive at least one analog RF signal different of the GNSS signal. The RF measurement device is configured to convert the at least one analog RF signal into at least one baseband signal. The at least one data processing circuit is configured to store baseband data associated with the baseband signal and positioning data associated with the GNSS signal within the memory device.

16 Claims, 4 Drawing Sheets

(51) Int. Cl.
    *G01S 19/42*     (2010.01)
    *H04W 24/08*     (2009.01)
    *H04W 56/00*     (2009.01)
    *H04W 72/044*     (2023.01)

(56) References Cited

U.S. PATENT DOCUMENTS

| | | |
|---|---|---|
| 2003/0145328 A1 | 7/2003 | Rabinowitz et al. |
| 2005/0003842 A1* | 1/2005 | Harju .................... H04W 24/00 |
| | | 455/502 |
| 2007/0030116 A1 | 2/2007 | Feher |
| 2008/0231449 A1 | 9/2008 | Moshfeghi |
| 2011/0273309 A1 | 11/2011 | Zhang et al. |
| 2012/0032876 A1 | 2/2012 | Tabe |
| 2013/0265117 A1 | 10/2013 | Ng et al. |
| 2014/0327579 A1 | 11/2014 | Hart et al. |
| 2018/0213355 A1 | 7/2018 | Smith et al. |
| 2020/0366402 A1* | 11/2020 | Dunn ...................... G01S 19/18 |
| 2023/0075053 A1* | 3/2023 | Rowell ................ H04B 17/391 |

* cited by examiner

RADIO FREQUENCY MEASUREMENT SYSTEM AND A METHOD FOR RECORDING BASEBAND AND POSITIONING DATA

STATEMENT REGARDING SEQUENCE LISTING

Embodiments of the disclosure generally relate to a radio frequency measurement system and a method for recording baseband and positioning data.

BACKGROUND

For wireless networks, such as mobile networks, the performance is commonly tested using radio frequency (RF) measurement setups, such as RF scanners. These measurement setups are applied to determine the presence of any interferers inside the wireless network. The RF scanner measures the underlying wireless signal and converts this signal into baseband data, for instance I and Q data. Subsequently, the converted baseband data is sent to a PC for baseband processing, analysis, and presentation.

In order to further evaluate the performance of the wireless network, supplementary data may be used in some approaches. For example, a positioning information or a time information may be acquired using secondary measurement devices. The information may then be used by the PC for a more sophisticated analysis. In this regard, the supplementary data may also be combined or correlated with the baseband data. In some instances, this occurs in near-real-time as the RF scanner for detecting the underlying wireless signal as well as the secondary measurement device may continuously transmit data to the PC for the data analysis.

However, sometimes it is desirable to be able to record the information for offline analysis at a later time. Moreover, using individual measurement devices for acquiring the underlying signals makes the evaluation complex and expensive.

Accordingly, there exists a need for a more compact and cost-efficient device and method to evaluate the performance of mobile networks, particularly of networks using radio frequency ranges, such as 5G FR2.

SUMMARY

The objective technical problem to be solved may be considered to include, for example, in overcoming or at least reducing the disadvantages according to the prior art. Embodiments of the present application, as such for in the independent claims, address such problem(s). Further embodiments are indicated within the dependent claims and the following description, each of which, individually or in combination, may represent aspects of the disclosure. Some aspects of the present disclosure are presented with regard to methods some with regard to respective devices. However, the features are correspondingly to be transferred vice versa.

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below.

According to an aspect, a radio frequency (RF) measurement system is provided. In an embodiment, the RF measurement system comprises at least one RF measurement device. The RF measurement device comprises at least one RF chain and at least one data processing circuit connected to a memory device. The RF measurement device is configured to receive a global navigation satellite system (GNSS) signal. The GNSS signal is indicative of a position and/or a bearing. The RF measurement device is configured to receive at least one analog RF signal different from the GNSS signal. The RF measurement device is configured to convert the at least one analog RF signal into at least one baseband signal. The at least one data processing circuit is configured to store baseband data associated with the baseband signal and positioning data associated with the GNSS signal within the memory device.

The so-designed RF measurement system provides the advantage that a GNSS signal and a separate analog RF signal may be detected using the same single setup. Different acquisition systems are avoided. Accordingly, the complexity of the measurement system is reduced and the cost-efficiency is improved. Moreover, a single set of data is provided in an easier fashion.

In some embodiments, the analog RF signal may comprise mobile network communication signals. For example, the analog RF signal may be an underlying signal of the 3G, 4G or 5G (LTE) standard of a mobile network communications system. Even more sophisticated signals corresponding to mobile communications standards like 5G-NR may be represented by the analog RF signal. Also, the analog RF signal may comprise different portions of these standards, such as the 5G FR1 or 5G FR2 frequency ranges. Hence, the analog RF signal comprises information used for characterizing the underlying mobile network standard, for example determining the respective performance, since the analog RF signal is indicative of the characteristics of the mobile network.

Accordingly, the RF measurement device may, for example, be a mobile network scanner.

Generally, the GNSS signal comprises information indicative of the position of a directional antenna receiving the GNSS signal. In some embodiments, the information relates to the RF measurement system that comprises several different components in defined geometrical relationship(s) such as a directional antenna assembly and/or a positioning antenna assembly.

In some embodiments, the GNSS signal may include information concerning latitude and/or longitude. For example, the GNSS signal may comprise a signal relating to at least one of the following standards: GPS, GLONASS, BeiDou, and Galileo.

Moreover, the GNSS signal may also comprise a timing information such as a timestamp. Accordingly, the GNSS signal comprises information concerning latitude, longitude and/or time, e.g. timing information according to Coordinated Universal Time (UTC).

The at least one memory device may be internal or external with regard to the at least one RF measurement device.

In general, the bearing corresponds to information of at least one angle, namely azimuth and/or elevation. It is known that the bearing can be determined in different ways, e.g. by a pseudo-Doppler technique, Watson-Watt technique or correlative interferometer.

In some embodiments, one single data processing circuit may be configured to store baseband data associated with the baseband signal and positioning data associated with the GNSS signal within the memory device. Therefore, no multiple data processing circuits are required.

In some embodiments, a single RF measurement device is configured to process the baseband data associated with the baseband signal and the positioning data associated with the GNSS signal, for example to store the baseband data associated with the baseband signal and the positioning data associated with the GNSS signal within the memory device.

Optionally, the baseband signal is a digital baseband signal and/or comprises in-phase and quadrature components (I/Q-components). Hence, the phase information of the underlying analog RF signal may be derived.

In some embodiments, the at least one RF chain comprises at least one amplifier, at least one filter device, and/or at least one analog-to-digital converter. Therefore, the analysis of the analog RF signal may be improved. The conversion into the baseband signal may be adapted according to the needs of the intended application, environment, etc. Unwanted frequency ranges may be suppressed by the at least one filter device, for example by using a high-pass filter device.

Alternatively or additionally, the baseband data and/or the respective positioning data may be stored within the memory device in a hybrid data format such that the stored data comprises a first data portion representing low resolution data and a second data portion representing high resolution data. In some embodiments, the second data portion is stored encrypted. Accordingly, the at least one data processing circuit is adapted to store the baseband data and/or the respective positioning data may be stored within the memory device in a hybrid data format. Further, the at least one data processing circuit is adapted to store the second data portion encrypted. Hence, a user may decrypt the second data portion provided that the user has the respective decryption key, also called Crypto keys. Then, the user is enabled to use the data in high resolution.

In some embodiments, the resolution of the data may relate to the resolution of the underlying baseband and/or positioning data with regard to at least one of a frequency resolution, a time resolution, and a precision of the positioning data. Accordingly, low resolution data may comprise data which has a resolution that is reduced at least in one aspect compared to high resolution data. Put differently, the user is enabled to obtain deeper insights while using the second data portion, namely the one with higher resolution.

Therefore, different resolutions of the data are provided in correspondence to the respective needs of the user. For example, some users may be interested in a more general evaluation only and may require low resolution data only. Crypto keys may be distributed to allow a user to gain access to encrypted data portions according to a desired data resolution.

Optionally, the RF measurement system may comprise a plurality of RF measurement devices. The plurality of RF measurement devices may then be arranged and configured to individually receive (different) GNSS signals and/or analog RF signals at different locations. Therefore, the possibility is provided to evaluate the performance of the analog RF signal at different locations. A spatial resolution of the performance of the underlying mobile network may thus be determined.

Furthermore, the GNSS signal may comprise time information. The at least one data processing circuit may be configured to timely synchronize baseband data and positioning data using the time information, namely the time information comprised in the global navigation satellite system signal. Thus, a synchronization between the baseband data and the positioning data may be provided.

In some embodiments, the at least one data processing circuit of the measurement system may be configured to timely synchronize baseband data and positioning data of a plurality of RF measurement devices. In some embodiments, the time synchronization may be performed based on time information contained within the positioning signal received by the at least one RF measurement device or by the multiple RF measurement devices. In other words, multiple RF measurement devices may be used to evaluate the performance of the analog RF signal. All the respectively acquired data may be synchronized with each other by at least one data processing circuit based on the time information contained within the respective positioning data. Hence, the data quality is improved and the evaluation of the underlying mobile network may be extended to different locations simultaneously investigated.

Alternatively or additionally, the at least one data processing circuit of each of the plurality of RF measurement devices may be configured to timely synchronize baseband data and positioning data of the respective RF measurement devices. In some embodiments, the time synchronization may be performed based on time information contained within the positioning signal received by at least one of the RF measurement devices. Therefore, a redundancy with regard to the time synchronization is provided.

Optionally, the time synchronization may be performed in a low resolution mode or at least one high resolution mode. Access to the high resolution data may depend on whether at least one crypto key for decrypting the second data portion is available to the at least one data processing circuit. Based on the crypto key, the degree with regard to the resolution may be determined. Therefore, the resolution may be determined according to a tailored fashion depending on the needs of the respective user.

Furthermore, the positioning signal may comprise timestamps. Consequently, baseband data of one or a plurality of RF measurement devices may be frequency synchronized based on the timestamps of the positioning signal received by at least one RF measurement device. Hence, the at least one data processing circuit is configured to frequency synchronize baseband data of a plurality of radio frequency measurement devices based on timestamps comprised in the positioning signal received by at least one radio frequency measurement device. Thus, the baseband data are referenced with regard to each other such that their comparableness is improved.

Moreover, even if there are multiple RF measurement devices and synchronization is provided among data obtained by the multiple RF measurement devices, one single data processing circuit may be configured to store baseband data associated with the baseband signal and positioning data associated with the GNSS signal obtained via the different RF measurement devices within a single memory device. Therefore, no multiple data processing circuits are required. The respective data may be exchanged between the multiple RF measurement devices such that the data is forwarded to the single data processing circuit.

Additionally, the memory device may be configured to provide the stored data to an external device. In some embodiments, the data may be provided to an external device configured for replaying the stored data. Then, a user may investigate the data in detail.

Optionally, the RF measurement system may also comprise a positioning antenna assembly. The positioning antenna assembly is configured to receive the GNSS signal. The RF measurement device is connected with the positioning antenna assembly, wherein the RF measurement device is configured to receive the GNSS signal from the positioning antenna assembly, which is indicative of the position and/or bearing.

Alternatively or additionally, the RF measurement system comprises a switched directional antenna assembly with several directional antennas. The switched directional antenna assembly may be connected with the at least one RF measurement device. The at least one RF measurement device may be configured to determine an orientation and/or a bearing of each individual directional antenna of the switched directional antenna assembly by using the positioning data derived from the GNSS signal. The switched directional antenna assembly may have a fixed pre-determined positional relation to a remainder of the RF measurement system. Therefore, if the positioning data are included in the evaluation, the orientation and/or the bearing of each individual directional antenna of the switched directional antenna assembly may be determined as well.

In other words, the GNSS signal may also comprise information concerning the bearing/orientation, for example the bearing/orientation of the directional antenna assembly that receives the GNSS signal. Based on this information, the respective bearing/orientation of the directional antenna assembly, for example the respective bearing/orientation of all individual directional antennas of the directional antenna assembly, can be determined, e.g. by taking geometrical relationships and/or mechanical connections of the respective antenna assemblies with respect to each other into account.

Generally, the bearing/orientation can be determined for each component of the RF measurement system, as the respective geometrical relationships and/or mechanical connections of these components are known.

In some embodiments, the geometrical relationships and/or mechanical connections of the respective antenna assemblies, namely the positioning antenna assembly and the switched directional antenna assembly, are known such that the bearing/orientation of each individual directional antenna can be determined based on the information received by the GNSS signal.

Accordingly, the RF measurement system is configured to determine the position and/or bearing of the switched directional antenna assembly, for example the position and/or bearing of each individual directional antenna of the switched directional antenna assembly, by processing the GNSS signal received.

Hence, the GNSS signal is also indicative of the position and/or bearing of each individual directional antenna of the switched directional antenna assembly.

The different kinds of data/information obtained from the positioning antenna assembly is forwarded to the RF measurement device. Consequently, the precision of the evaluation of the underlying mobile network is improved.

In some embodiments, the at least one data processing circuit may comprise at least one processor circuit selected from the following: a central processing unit (CPU), a graphics processing unit (GPU), an application-specific integrated circuit (ASIC) and/or a field programmable gate array (FPGA).

According to another aspect, a method for recording baseband and positioning data is provided. In an embodiment, the method comprises the step of receiving at least one analog RF signal and a GNSS signal by at least one RF measurement device. Furthermore, the method comprises the step of converting the at least one analog RF signal into at least one baseband signal by at least one RF measurement device. Additionally, the method comprises the step of storing baseband data associated with the baseband signal and positioning data associated with the GNSS signal within a memory device associated with the at least one RF measurement device.

The so-designed method allows for a more convenient data management. Baseband data and positioning data are stored simultaneously within a single memory device. Moreover, both signals are detected using a single device, namely the at least one RF measurement device. Accordingly, the method is less complex and, thus, improved compared to existing methods.

Optionally, the method may also comprise the step of receiving a plurality of analog RF signals and/or a plurality of GNSS signals by a plurality of RF antennas at different locations. This may be used to more precisely determine the performance of the analog RF signal and its underlying mobile network communications system.

As an additional option, the method may comprise the step of timely synchronizing baseband data associated with the plurality of analog RF signals and positioning data associated with the plurality of the GNSS signals based on time information contained within the received GNSS signals. Accordingly, a defined relationship between the baseband data and the positioning data is provided. Hence, the underlying mobile network communications system may be better characterized since the determined data is determined at a higher quality level.

Also, the method may comprise the step of frequency synchronizing the baseband data of different analog RF signals received based on timestamps contained within at least one of the received GNSS signals. That is another measure to improve the data quality. The baseband data emerging from different analog RF signals are compared with regard to their frequency and a standardized frequency scale is introduced. Accordingly, conclusions based on the baseband data emerging from different analog RF signals may be performed with improved accuracy.

Any of the aspects mentioned hereinabove may be (sub-)combined with any other aspect provided that the skilled artisan is accordingly provided with conceivable developments.

The switched directional antenna assembly of directional, for example Vivaldi-type, antennas is used to achieve wide bandwidth. The switched directional antenna assembly comprises N directional antennas facing N directions, wherein each of the N directional antennas can be turned ON via a switch individually. The switch is controlled by the radio frequency measurement device appropriately.

The radio frequency measurement device simultaneously records the GNSS signal with positioning and/or bearing information, information regarding which directional antenna is ON, and the I/Q baseband data associated with the switched directional antenna(s).

All the information simultaneously obtained is combined by the radio frequency measurement device, wherein output metadata may be generated. Hence, the output metadata encompasses I/Q data indicative of the analog radio frequency signal as well as control data indicative of the switching state of the switch, namely which of the several individual directional antenna(s) was/were turned on during the measurement, as well as position and/or bearing data. This metadata is passed to a separate processing circuit, included, for instance in a laptop, tablet, PC, server, cloud-based processing, etc.), for further processing, e.g. baseband processing.

Due to the simultaneous processing, real-time processing is ensured. However, the combined information, namely the output metadata, may also be stored in the storage medium such that the further processing can be done subsequently, e.g. in a post-processing.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
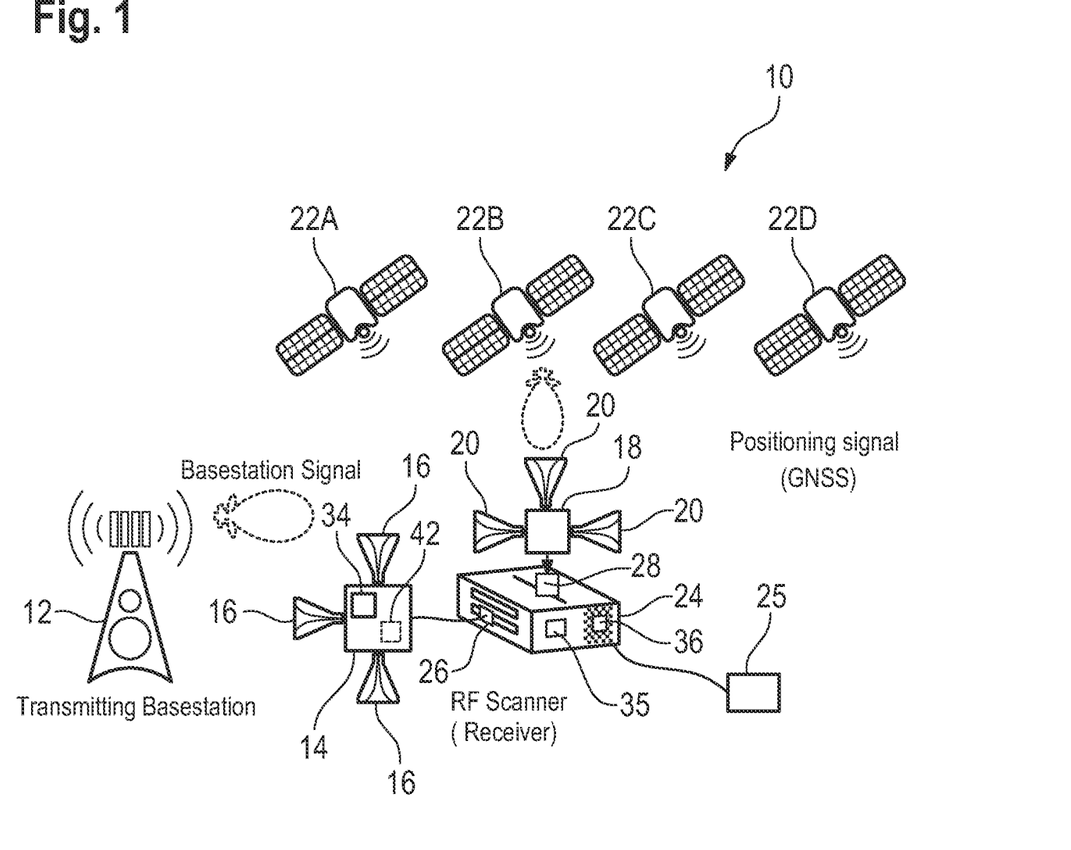
FIG. 1 is a schematic drawing of a representative RF measurement system according to an embodiment of the disclosure.

In FIG. 1, an example embodiment of a radio frequency (RF) measurement system, generally designated 10, is shown. The RF measurement system 10 is suitable for use in mobile network testing, e.g. testing a mobile network provided by a base station 12, also called transmitting base station. Embodiments of the RF measurement system 10 may be used to determine the performance of the mobile network or for interference hunting, namely identifying any source of interfering signals.

In the embodiment shown, the RF measurement system 10 comprises a switched directional antenna assembly 14 having several directional antennas 16, for example antennas 16 of the type of Vivaldi, namely Vivaldi antennas, which are also called tapered slot antennas (TSA). The several directional antennas 16 of the switched directional antenna assembly 14 are oriented in different directions. In some embodiments, all of the respective directional antennas 16 are oriented in a certain direction that is different to the one of another antenna 16 of the switched directional antenna assembly 14, thereby ensuring that each of the several directional antennas 16 is oriented towards a dedicated direction.

The RF measurement system 10 also comprises a positioning antenna assembly 18 that may also comprise several positioning antennas 20. In general, the positioning antenna assembly 18 is configured to receive a global navigation satellite system (GNSS) signal, for instance a GPS, BeiDou, Galileo, GLONASS or similar positioning signal. The respective GNSS signal may be emitted by a satellite 22A, 22B, 22C, 22D as indicated in FIG. 1. In some embodiments, the positioning antenna assembly 18 may be configured to simultaneously receive multiple positioning signals of different satellites 22A, 22B, 22C, 22D.

The RF measurement system 10 may further comprise a RF measurement device 24, for example a RF receiver, that has a first interface 26 to which the switched directional antenna assembly 14 is connected as well as a second interface 28 to which the positioning antenna assembly 18 is connected. Accordingly, both antenna assemblies 14, 18 are connected with the RF measurement device 24 that receives the respective signals from the antenna assemblies 14, 18 accordingly.

In use, the RF measurement device 24 receives the GNSS signal from the positioning antenna assembly 18 via the second interface 28. The respective GNSS signal is indicative of the position and/or bearing/orientation, for example the position and/or bearing/orientation of the positioning antenna assembly 18. However, the relative orientation of the positioning antenna assembly 18 with respect to the other components of the RF measurement system 10, for example the switched directional antenna assembly 14, e.g. each individual directional antenna 16, is known or predefined due to mechanical and/or geometrical relationships such that the RF measurement device 24 is enabled to determine the position and/or bearing of the other components of the RF measurement system 10 accordingly, for example the one of the switched directional antenna assembly 14, for example of each individual directional antenna 16.

Since the RF measurement device 24 is also connected with the switched directional antenna assembly 14, the RF measurement device 24 also receives an analog RF signal from the switched directional antenna assembly 14 that corresponds to the base station signal emitted by the transmitting base station 12 that has been received by at least one of the several directional antennas 16 of the switched directional antenna assembly 14.

The respective analog RF signal received is internally processed by the RF measurement device 24 wherein the analog RF signal is converted to a baseband signal for further processing.

Figure 2:
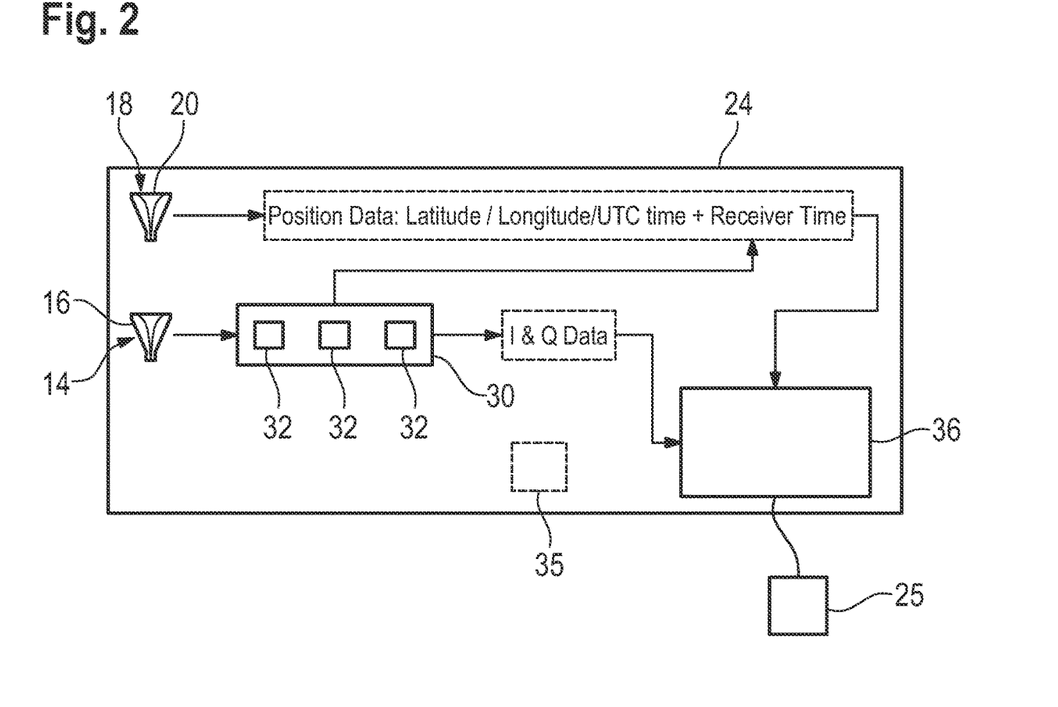
FIG. 2 is a schematic drawing of an overview illustrating an example data/information exchange within a RF measurement device.

In FIG. 2, an overview is provided that illustrates the respective data/information exchange between the components of the RF measurement system 10, for example the antenna assemblies 14, 18 and the RF measurement device 24.

In some embodiments, the RF measurement device 24 generally comprises a RF chain 30 that has several components 32 for processing the analog RF signal. The respective components 32 may relate to a down-converter, an amplifier, a filter device and/or an analog-to-digital converter, for example. Generally, a down-converter may also be provided at the output of the RF measurement device 24.

The RF measurement device 24 is enabled to convert the analog RF signal received from the switched directional antenna assembly 14 into a digital baseband signal, for example I/Q components, by processing the analog RF signal by the components 32 of the RF chain 30.

The RF measurement system 10 may optionally comprise at least one switch 34 that is controlled by the RF measurement device 24. The switch 34 may be integrated in the switched directional antenna assembly 14 as shown in FIG. 1, wherein the switch 34 has different switching states that define a certain subset of the several directional antennas 16 to be switched on wherein the other directional antennas 16 are switched off.

Generally, the different switching states may comprise states in which only one individual directional antenna 16 of the several directional antennas 16 of the switched directional antenna assembly 14 is switched on, whereas all other directional antennas 16 are switched off. However, further switching states may also comprise that more than one of the several directional antennas 16 are switched on simultaneously, thereby enlarging the beam width of the switched directional antenna assembly 14 used for receiving the base station signal.

In a certain embodiments, all of the several directional antennas 16 may be switched on simultaneously, thereby ensuring that the switched directional antenna assembly 14 is operated as an omnidirectional antenna.

The respective switch 34 is controlled by the RF measurement device 24 as also shown in FIG. 1 since the RF measurement device 24 forwards a respective control signal to the switch 34.

The RF measurement system 10 may comprise a local oscillator 35 that provides a local oscillator signal used as a clock signal for controlling the switch 34 appropriately. The local oscillator 35 may be integrated in the RF measurement device 24. In other words, the clock signal is used for switching the respective directional antennas 16 in a defined manner.

The RF measurement device 24 receives the respective information/data from the antenna assemblies 14, 18, namely the GNSS signal or information related thereto as well as the analog RF signal associated with the base station signal of the transmitting base station 12. In addition, the RF measurement device 24 also has the information concerning the respective switching state of the switch 34 and, therefore, the respective directional antennas 16 of the switched directional antenna assembly 14. Accordingly, the respective information concerning the switching state relates to control data provided by the RF measurement device 24.

In other words, the RF measurement device 24 has information concerning the position and bearing/orientation, the control data, namely the switching state, as well as the baseband, e.g. I/Q data. The RF measurement device 24 processes the different information/data obtained, for example by a data processing circuit 36, wherein the data/information is combined, and thereby generating output metadata. In some embodiments, the baseband data obtained through processing the at least one analog RF signal is associated with respective data obtained through processing the at least one GNSS signal.

For example, the GNSS signal comprises time information. This time information is used to timely synchronize the baseband data with respective data obtained from the GNSS signal, for example positioning data. The synchronization is performed by the data processing circuit 36.

For instance, the different information/data obtained is processed by a single data processing circuit 36 such that the data/information is combined, thereby generating output metadata.

The synchronization of data obtained from processing the analog RF signal and data obtained from processing the GNSS signal is performed with varying resolution. In this regard, resolution relates to at least one of the underlying baseband and/or positioning data with regard to at least one of a frequency resolution, a time resolution, and a precision of the positioning data. Accordingly, low resolution data may comprise data which has a resolution that is reduced at least in one aspect compared to high resolution data.

That means that the metadata outputted by the data processing circuit comprises at least a first data portion having a rather low resolution of synchronized baseband and positioning data as well as a second data portion having a comparably high resolution of synchronized baseband and positioning data. The second data portion is encrypted and, thus, restricted to authorized persons only. These persons may receive a crypto key from a seller of the RF measurement system 10 and then be enabled to make use of the high resolution data.

In other words, the metadata have a hybrid data format of a first data portion representing unencrypted data having a comparably low resolution and a second data portion representing encrypted data having a comparably high resolution.

In some embodiments, the data processing circuit 36 can be implemented with or include, among other circuitry, a central processing unit (CPU), a graphical processing unit (GPU), an application-specific integrated circuit (ASIC) and/or a field-programmable gate array (FPGA).

The output metadata having a hybrid data format is stored in a respective memory device 25 by the data processing circuit 36. Although the memory device 25 is shown as being external with regard to the RF measurement device 24, this is only an option. The memory device 25 can also be internal of the RF measurement device 24. Any suitable computer readable storage media may be utilized by one or more embodiments of the memory device 25.

The memory device 25 is configured to provide the stored data to additional external devices, for example for replaying the stored data. A separately formed processing equipment 38, for instance a computer, a tablet, a laptop, a server, etc., may be used in this regard.

Accordingly, the at least one data processing circuit 36, for example the single data processing circuit 36, is generally configured to store baseband data associated with the baseband signal and positioning data associated with the global navigation satellite system signal within the memory device 25.

Figure 3:
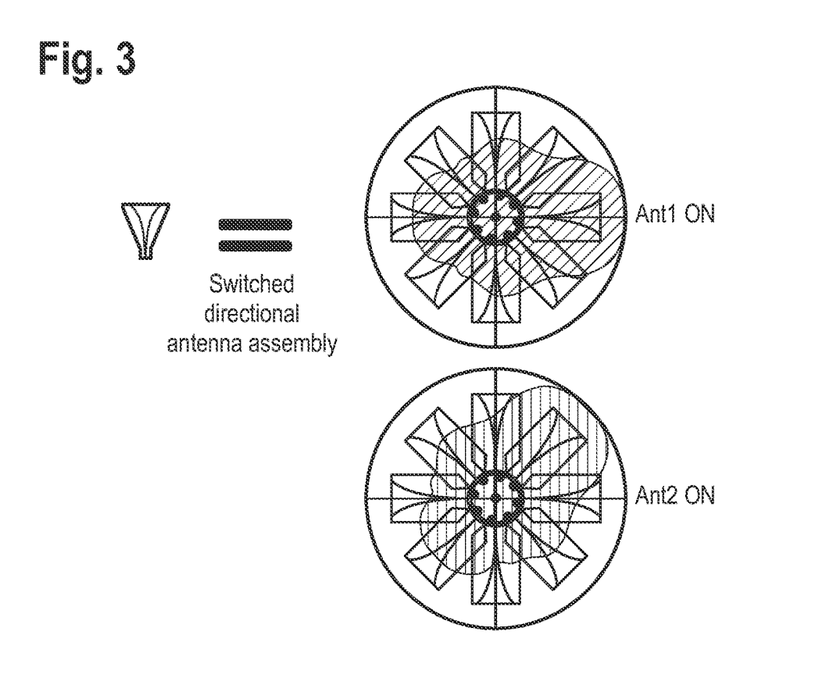
FIG. 3 is a schematic drawing of a representative switched directional antenna assembly.

As shown in FIG. 3, the respective control data may provide information concerning the respective orientation/bearing of the respective directional antenna 16 switched on, e.g. Ant1 or Ant2, during the respective measurement, thereby providing a deeper insight which improves the performance characterization of the network to be tested, as information is obtained in which direction the RF measurement system 10 is pointing, for example the switched directional antenna assembly 14.

In a certain embodiment, the RF measurement system 10 may have a magnetometer sensor 42 (illustrated in dashed lines in FIG. 1) that is configured to determine its orientation, thereby providing information of the bearing of the magnetometer sensor 42. The magnetometer sensor 42 may be associated with the switched directional antenna assembly 14 such that information concerning the orientation of the switched directional antenna assembly 14, for example each individual directional antenna 16, is provided by the magnetometer sensor 42.

However, the magnetometer sensor 42 may also be connected to the positioning antenna assembly 18 or any other component of the RF measurement system 10, as the relative orientations and/or connections between the individual components of the RF measurement system 10 are known, thereby allowing to determine the relative orientation of each component of the RF measurement system 10 accordingly.

Since the information concerning the bearing/orientation can be determined by the separately formed magnetometer sensor 42, it is not necessary to obtain the respective kind of information from the GNSS signal that is received by the positioning antenna assembly 18. In other words, the GNSS signal is only processed to obtain the position data, e.g. latitude, longitude and/or timing information such as UTC time.

Figure 4A:
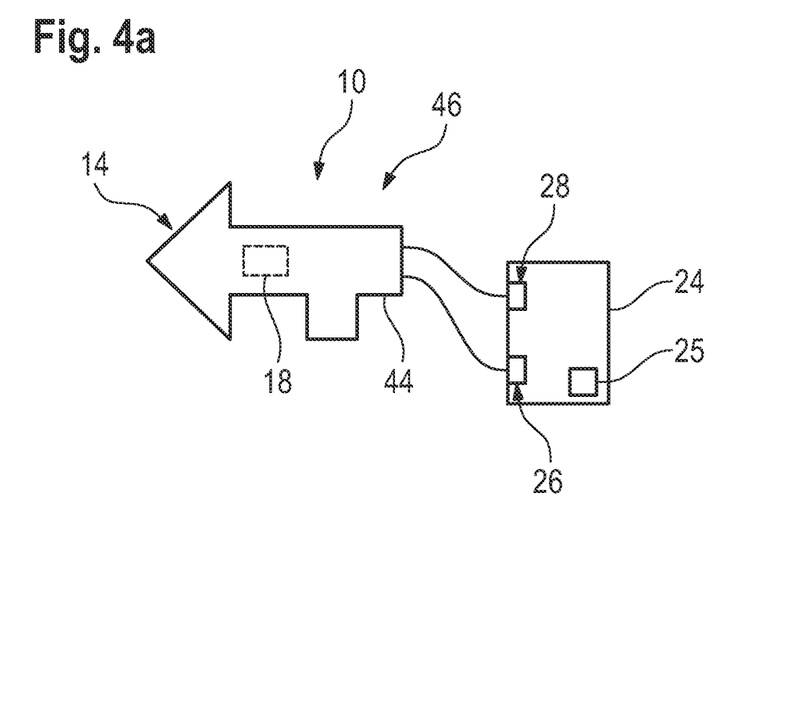
FIGS. 4a and 4b are schematic drawings of two certain embodiments of the RF measurement systems according to the disclosure.

In FIG. 4*a*, a certain embodiment of the RF measurement system 10 is shown, as the RF measurement system 10 comprises a handheld device 44 that can be carried by an operator of the RF measurement system 10, for example for interference hunting.

In the handheld device 44, at least one of the antenna assemblies 14, 18, for example the switched directional antenna assembly 14 with the several directional antennas 16 is integrated. However, the handheld device 44 may also comprise the positioning antenna assembly 18 with the antennas 20.

In a certain embodiment, the handheld device 44 may also comprise the RF measurement device 24. Alternatively the RF measurement device 24 is provided separately, wherein the handheld device 44 is connected with the respective interfaces 26, 28 of the RF measurement device 24. The RF measurement device 24 may be carried by the operator, for instance in a backpack.

Accordingly, the entire RF measurement system 10 in some embodiments may be a movable scanner system 10, as the handheld device 44 corresponds to a movable platform 46.

Therefore, mobile network testing can be performed while moving, for instance walking in a field.

Figure 4B:
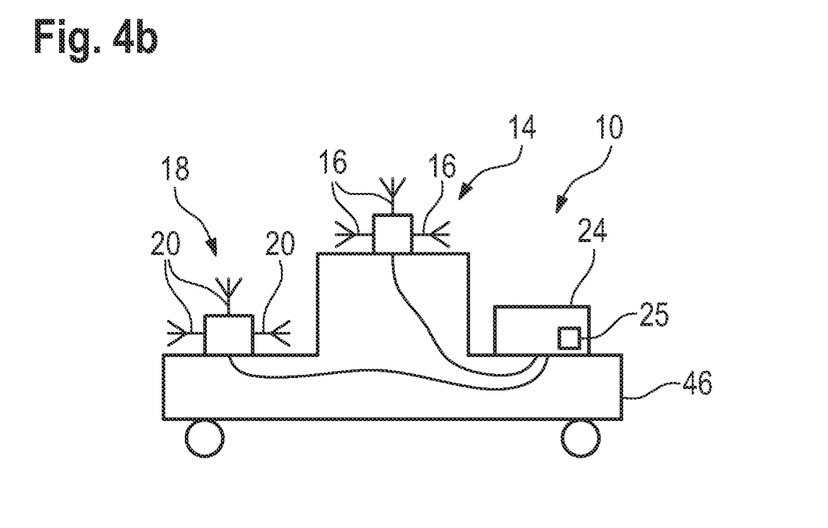

In FIG. 4*b*, an alternative embodiment of the RF measurement system 10 is shown, as the RF measurement system 10 comprises a motorized movable platform 46, like a vehicle.

As shown in FIG. 4*b*, the switched directional antenna assembly 14, the RF measurement device 24 and the positioning antenna assembly 18 all are mounted on the motorized movable platform 46 such that mobile network testing can be performed while moving in the field, for example driving.

Figure 5:
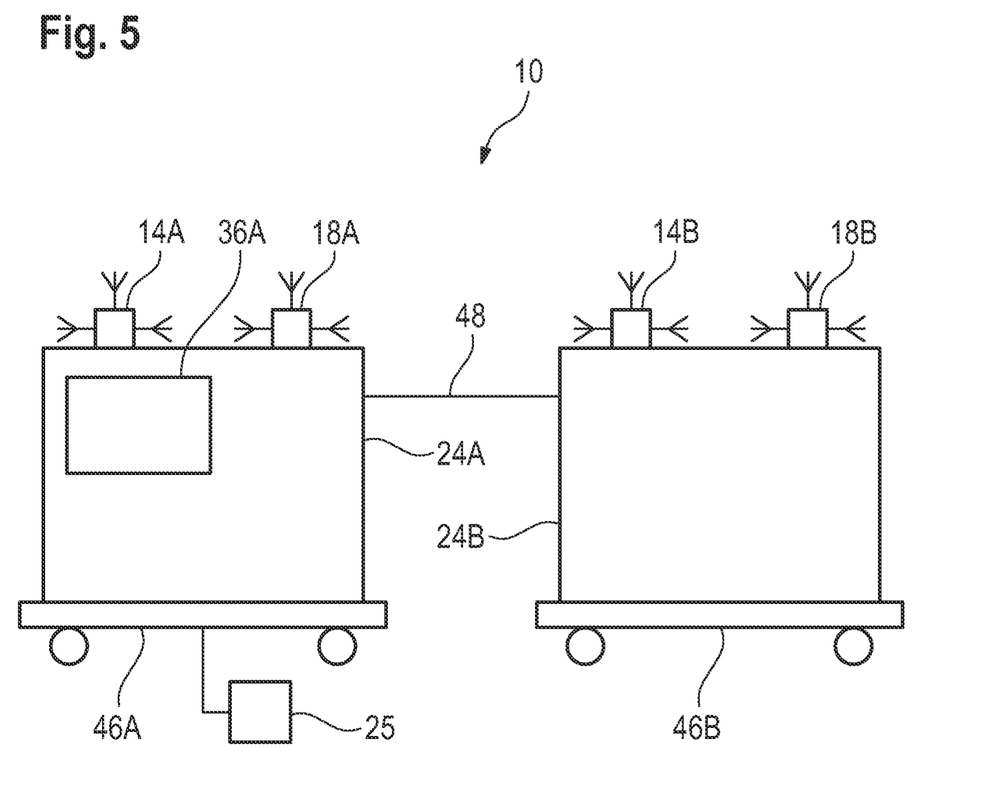
FIG. 5 is a schematic drawing of another embodiment of the RF measurement system.

FIG. 5 is a schematic drawing of another embodiment of the RF measurement device 10. The RF measurement system 10 comprises multiple RF measurement devices 24, namely a first RF measurement device 24A and a second RF measurement device 24B. Both RF measurement devices 24A, 24B comprise respective components, such as directional antenna assemblies 14A, 14B and positioning antenna assemblies 18A, 18B. Hence, the RF measurement devices 24A, 24B may receive different GNSS signals from the different positioning antenna assemblies 18A, 18B.

According to this embodiment, the data processing circuit 36A of the first RF measurement device 24A is configured to process data received by the assemblies of the individual RF measurement devices 24A, 24B. The generally separate RF measurement devices 24A, 24B comprise a data connection 48 for allowing a data transfer in this regard. The data connection 48 may be a cabled connection but, of course, may also be wireless according to any known or future developed protocol.

The data processing circuit 36A of the first RF measurement device 24A is specifically configured to timely synchronize baseband data received by directional antenna assemblies 14A, 14B of the individual RF measurement devices 24A, 24B based on time information contained within the positioning signals received by the respective positioning antenna assemblies 18A, 18B.

Since both RF measurement devices 24A, 24B are coupled to separate movable platforms 46A, 46B, an underlying mobile communications network may thus be investigated simultaneously at different locations. Though this generally leads to time differences with regard to the data received by the individual RF measurement devices 24A, 24B, the data processing circuit 36A can compensate for such differences through the use of an appropriate time synchronization of the data.

In addition, the data processing circuit 36A is also configured to frequency synchronize the baseband data obtained based on the analog RF signals received by the individual RF measurement devices 24A, 24B through the directional antenna assemblies 14A, 14B. Timestamps being part of the time information included in the respective positioning data are used in this regard.

The frequency synchronization of the individual baseband data ensures that the respective data may be compared to each other without any systematic errors due to the use of individual RF measurement devices 24A, 24B. Hence, the comparison of the respective baseband data is provided with improved accuracy.

Both the time synchronization as well as the frequency synchronization may be performed in different modes having different resolutions as exemplarily explained herein before. In some embodiments, the high resolution data portion may be encrypted.

Accordingly, a single set of synchronized metadata optionally having a hybrid data format is provided which is stored in a memory device 25 coupled to the first RF measurement device 24A. Therefore, investigating the underlying mobile communications network may be achieved more efficiently.

Generally, all individual data processing circuits 36 of the respective RF measurement devices 24A, 24B may be configured to provide the synchronization effects as explained herein. Accordingly, a redundancy is achieved with regard to the data processing circuits 36 in view of the synchronization mechanisms.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), a graphical processing unit (GPU), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some embodiments, the functionality described herein can be implemented by special purpose hardware-based computer systems or circuits, etc., or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A radio frequency measurement system comprising:
    at least one radio frequency measurement device, the radio frequency measurement device comprising at least one radio frequency chain and at least one data processing circuit connected to a memory device,
    wherein the radio frequency measurement device is configured to:
        receive a global navigation satellite system signal, wherein the global navigation satellite system signal is indicative of a position and/or a bearing;
        receive at least one analog radio frequency signal different from the global navigation satellite system signal; and
        convert the at least one analog radio frequency signal into at least one baseband signal;
    wherein the at least one data processing circuit is configured to store baseband data associated with the baseband signal and positioning data associated with the global navigation satellite system signal within the memory device.

2. The measurement system according to claim 1, wherein the baseband signal is a digital baseband signal and/or comprises in-phase and quadrature components.

3. The measurement system according claim 1, wherein the at least one radio frequency chain comprises at least one amplifier, at least one filter device, and/or at least one analog-to-digital converter.

4. The measurement system according claim 1, wherein the at least one data processing circuit is adapted to store baseband data and/or the respective positioning data within the memory device in a hybrid data format such that the stored data comprises a first data portion representing low resolution data and a second data portion representing high resolution data.

5. The measurement system according to claim 4, wherein the at least one data processing circuit is adapted to store the second data portion encrypted.

6. The measurement system according to claim 4, wherein the at least one data processing circuit is configured to timely synchronize baseband data and positioning data of a plurality of radio frequency measurement devices, and wherein the at least one data processing circuit is adapted to timely synchronize baseband data and positioning data in a low resolution mode or at least one high resolution mode depending on whether at least one crypto key for decrypting the second data portion is available to the at least one data processing circuit.

7. The measurement system according to claim 1, further comprising a plurality of radio frequency measurement devices, wherein the plurality of radio frequency measurement devices is arranged and configured to receive different global navigation satellite system signals at different locations.

8. The measurement system according to claim 1, wherein the at least one data processing circuit is configured to timely synchronize baseband data and positioning data by using time information comprised in the global navigation satellite system signal.

9. The measurement system according to claim 1, wherein the at least one data processing circuit is configured to timely synchronize baseband data and positioning data of a plurality of radio frequency measurement devices.

10. The measurement system according to claim 9, wherein the at least one data processing circuit of each of the plurality of radio frequency measurement devices is configured to timely synchronize baseband data and positioning data of the respective radio frequency measurement devices.

11. The measurement system according to claim 1, wherein the at least one data processing circuit is configured to frequency synchronize baseband data of a plurality of radio frequency measurement devices based on timestamps comprised in the positioning signal received by at least one radio frequency measurement device.

12. The measurement system according to claim 1, wherein the memory device is configured to provide the stored data to an external device.

13. The measurement system according to claim 1, further comprising a switched directional antenna assembly with several directional antennas, wherein the switched directional antenna assembly is connected with the radio frequency measurement device, and wherein the radio frequency measurement device is configured to determine the orientation/bearing of each individual directional antenna of the switched directional antenna assembly by using the positioning data derived from the global navigation satellite system signal.

14. A method for recording baseband and positioning data, the method comprising at least the steps of:
- receiving at least one analog radio frequency signal and a global navigation satellite system signal by at least one radio frequency measurement device;
- converting the at least one analog radio frequency signal into at least one baseband signal by at least one radio frequency measurement device; and
- storing baseband data associated with the baseband signal and positioning data associated with the global navigation satellite system signal within a memory device associated with the at least one radio frequency measurement device.

15. The method of claim 14, further comprising at least one of the following steps:
- receiving a plurality of analog radio frequency signals and/or a plurality of global navigation satellite system signals by a plurality of radio frequency antennas at different locations;
- timely synchronizing baseband data associated with the plurality of analog radio frequency signals and positioning data associated with the plurality of the global navigation satellite system signals based on time information contained within the received global navigation satellite system signals; or
- frequency synchronizing the baseband data of different analog radio frequency signals received based on timestamps contained within at least one of the received global navigation satellite system signals.

16. The method of claim 14, wherein the baseband data and/or the respective positioning data are stored within the memory device in a hybrid data format such that the stored data comprises a first data portion representing low resolution data and a second data portion representing high resolution data, wherein the second data portion is stored encrypted.

\* \* \* \* \*